(12) United States Patent
Sipple et al.

(10) Patent No.: US 8,864,904 B2
(45) Date of Patent: Oct. 21, 2014

(54) METHOD FOR PROCESSING AND UTILIZING BYPASS DUSTS OBTAINED DURING THE PRODUCTION OF CEMENT

(75) Inventors: Ernst-Michael Sipple, Vienna (AT); Carlos Enrique Alzate Madero, Kosice (SK); Peter Szabados, Bratislava (SK); Michal Vajansky, Bratislava (SK); Viktor Svarc, Bratislava (SK); Gerald Koglbauer, St. Jakob im Rosental (AT)

(73) Assignee: Holcim Technology Ltd, Rapperswil-Jona (CH)

( * ) Notice: Subject to any disclaimer, the term of this patent is extended or adjusted under 35 U.S.C. 154(b) by 0 days.

(21) Appl. No.: 14/113,051

(22) PCT Filed: Apr. 23, 2012

(86) PCT No.: PCT/AT2012/000109
§ 371 (c)(1),
(2), (4) Date: Dec. 30, 2013

(87) PCT Pub. No.: WO2012/142638
PCT Pub. Date: Oct. 26, 2012

(65) Prior Publication Data
US 2014/0109801 A1    Apr. 24, 2014

(30) Foreign Application Priority Data
Apr. 21, 2011 (AT) .................. A 577/2011

(51) Int. Cl.
*C04B 7/43* (2006.01)
*C04B 7/60* (2006.01)

(52) U.S. Cl.
CPC .. *C04B 7/436* (2013.01); *C04B 7/60* (2013.01)
USPC ......................... 106/751; 106/739

(58) Field of Classification Search
CPC ............ C04B 7/436; C04B 7/60; B01D 9/00; B09B 3/00; B09B 5/00
USPC ................................ 106/739, 751
See application file for complete search history.

(56) References Cited

U.S. PATENT DOCUMENTS

| | | | |
|---|---|---|---|
| 6,613,141 B2 * | 9/2003 | Key, Jr. ................. | 106/751 |
| 7,947,242 B2 * | 5/2011 | Saito et al. ............. | 423/242.1 |
| 8,048,314 B2 * | 11/2011 | Konishi et al. ......... | 210/710 |
| 2003/0061972 A1 | 4/2003 | Key, Jr. | |
| 2007/0098035 A1 * | 5/2007 | Shinichiro et al. ..... | 373/8 |
| 2009/0283016 A1 | 11/2009 | Mohamed et al. | |
| 2011/0065854 A1 | 3/2011 | Mohamed et al. | |

FOREIGN PATENT DOCUMENTS

| | | | | |
|---|---|---|---|---|
| DE | 102010019100 | * 11/2011 | ............. | C01D 3/08 |
| JP | 2005177757 A | * 7/2005 | ............. | B09B 3/00 |
| JP | 2006347794 A | * 12/2006 | ............. | C04B 7/80 |
| WO | 2012/024511 A1 | 2/2012 | | |

OTHER PUBLICATIONS

International Search Report dated Sep. 25, 2012, issued in International Application PCT/AT2012/000109.
International Preliminary Examination Report dated Apr. 15, 2013, issued in International Application PCT/AT2012/000109.
Robert W. Peters et al., "Separation of Heavy Metals: Removal From Industrial Wastewaters and Contaminated Soil", Energy Systems Division, Argonne National Laboratory, Argonne, IL, [Manuscript—Engineering Foundation International Conference on Emerging Separation Technologies for Metals and Fuels; Palm Beach], Mar. 4, 1993, pp. 1-62 XP-002682708.
Stephen McAnally et al., "Nickel Removal from a Synthetic Nickel-Plating Wastewater Using Sulfide and Carbonate for Precipitation and Coprecipitation", Separation of Science and Technology, Dekker, NY, vol. 19, No. 2 & 3, pp. 191-217, 1984, XP-009162124.

* cited by examiner

*Primary Examiner* — Anthony J Green
(74) *Attorney, Agent, or Firm* — Fitch, Even, Tabin & Flannery LLP

(57) ABSTRACT

In a method for processing and utilizing bypass dust obtained during the production of cement, it is proceeded as a) contacting the bypass dust with an aqueous phase and mixing the same to obtain a homogenous slurry, with water-soluble components of the bypass dust being dissolved in the aqueous phase, b) carrying out a solid-liquid separation to separate the solids contained in the slurry so that a brine is remaining, c) separating heavy metals present in the brine and precipitating calcium as poorly soluble calcium salts, e.g. $CaCO_3$, to obtain a processed brine, and d) subjecting the processed brine to a fractional crystallization.

31 Claims, 2 Drawing Sheets

METHOD FOR PROCESSING AND UTILIZING BYPASS DUSTS OBTAINED DURING THE PRODUCTION OF CEMENT

CROSS-REFERENCE TO RELATED APPLICATIONS

This Application is a U.S. National Stage Application filed under 35 U.S.C. §371 of International Application PCT/AT2012/000109, filed Apr. 23, 2012, designating the United States, which claims priority from Austrian Patent Application A 572/2011, filed Apr. 21, 2011, the complete disclosures of which are hereby incorporated herein by reference in their entirety for all purposes.

FIELD OF THE INVENTION

The invention relates to a method for processing and utilizing bypass dusts obtained during the production of cement.

BACKGROUND INFORMATION

The main components of bypass dusts are $CaO$, $Al_2O_3$, $SiO_2$ and $Fe_2O_3$ as well as condensed impurities such as $Na_2O$, $K_2O$, $SO_3$ and $Cl$.

In cement production, the hot exhaust gases from the kiln are used to preheat the raw meal. The vaporous components such as $Na_2O$, $K_2O$, $SO_3$ and $Cl$, which are contained in the exhaust gas, condense due to cooling and are returned into the kiln along with the raw meal. An internal circulation of such substances which evaporate in the kiln and condense out of the exhaust gas during preheating of the raw meal is thus created in cement production. Along with the raw meal or the fuels, new, unavoidable components are constantly introduced such that the described circulations will become increasingly enriched unless a portion of the hot exhaust gases from the kiln is constantly withdrawn, and hence also the evaporated impurities are proportionally eliminated from the production process. This partial gas stream is cooled and dedusted, the dust being referred to as cement kiln gas bypass dust or briefly bypass dust in the following, wherein the unavoidable components condense on the dust grains and are separated from the exhaust gas along with the dust. The occurring bypass dust can be used as a cement grinding additive depending on its composition and the desired cement quality.

The use of alternative fuels or the use of specific raw materials in the cement production process, and the associated introduction of additional unavoidable components, involve the formation of increasing amounts of bypass dusts, which cannot be completely utilized without elaborate processing and are therefor partially dumped by many cement producers, thus constituting a considerable environmental impact. Dumping is also disadvantageous in that it entails accordingly high losses of components suitable for cement production. As a rule, an economically reasonable use of such products in the cement industry fails because of alkali, chloride, sulfur or heavy metal contents that are too high.

SUMMARY OF THE INVENTION

The object, therefore, resides in processing the bypass dust occurring in the production of cement, i.e. separating the useful components from the impurities in order to recover as much as reusable material as possible, on the one hand, and keep the fraction containing unavoidable components as small as possible, on the other hand.

To solve this object, the invention provides a method that comprises the steps of:

a) contacting the bypass dust with an aqueous phase and mixing the same to obtain a homogenous slurry, with water-soluble components of the bypass dust being dissolved in the aqueous phase, b) carrying out a solid-liquid separation, in particular a vacuum filtration or a filter press filtration, to separate the solids contained in the slurry, with a brine remaining, c) separating heavy metals present in the brine and precipitating calcium to obtain a processed brine, and d) subjecting the processed brine to a fractional crystallization.

Preferred further embodiments are as described elsewhere herein.

DETAILED DESCRIPTION

Figure 1:
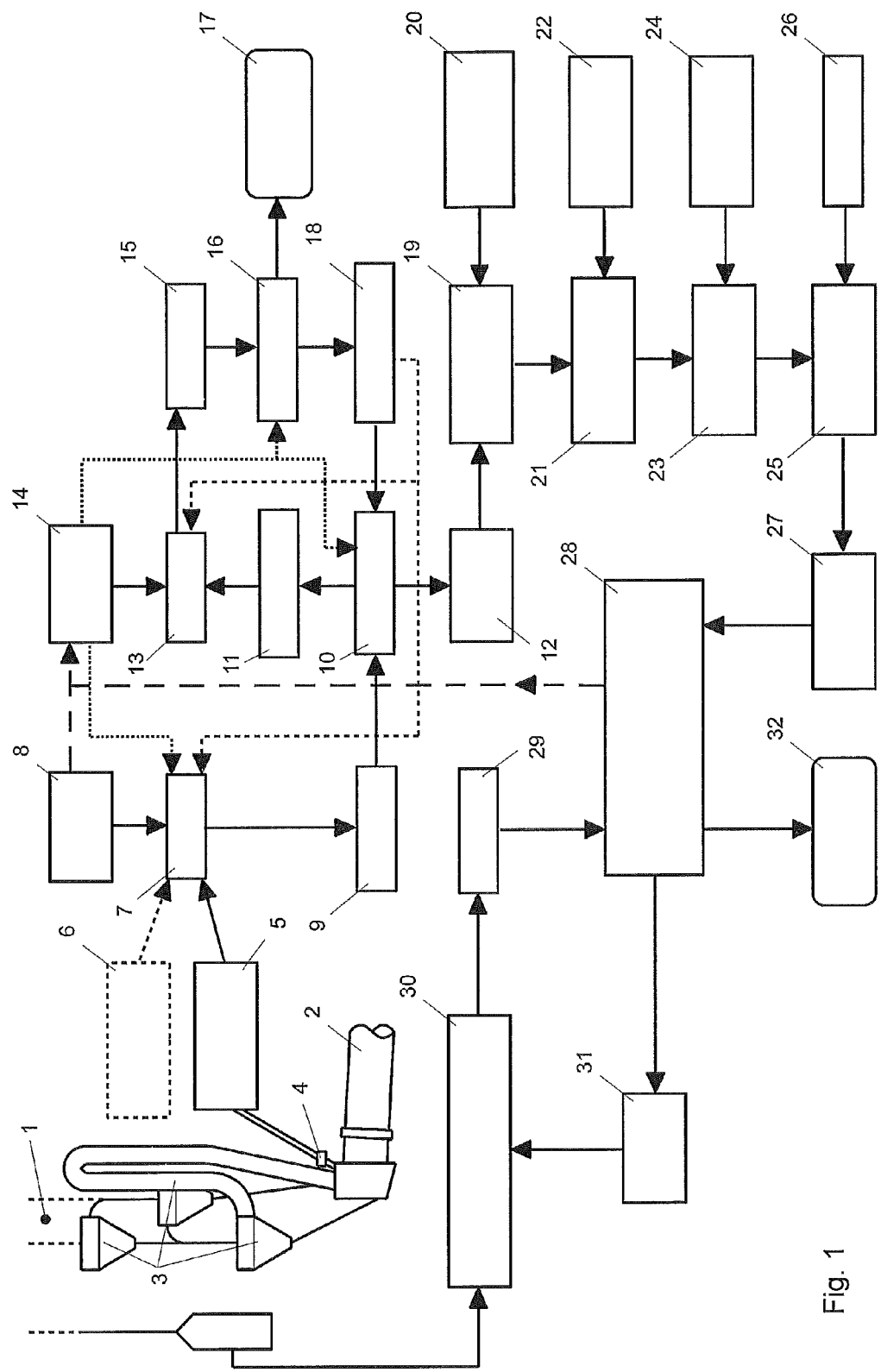
FIG. 1 depicts a first exemplary embodiment.

A method for processing and utilizing bypass dusts obtained during the production of cement is provided. In one of its aspects, a method comprises the steps of: a) contacting the bypass dust with an aqueous phase and mixing the same to obtain a homogenous slurry, with water-soluble components of the bypass dust being dissolved in the aqueous phase; b) carrying out a solid-liquid separation, in particular a vacuum filtration or a filter press filtration, to separate the solids contained in the slurry, with a brine remaining; c) separating heavy metals present in the brine and precipitating calcium to obtain a processed brine; and d) subjecting the processed brine to a fractional crystallization.

Thus, it may, in particular, be provided that the ratio of bypass dust to aqueous phase in step a) is 1:1 to 1:2.

In step a), HCl is preferably added and mixed with the other components to form a homogenous slurry in order to adjust the contents of alkalis and halogenides.

In a preferred manner, a first separation step is performed according to step b) to obtain a strong brine, which is fed to step c), wherein the solids separated in the first separation step are slurried using an aqueous medium, wherein the water-soluble components of the solids are dissolved in the aqueous phase and the thus obtained slurry is subjected to a second separation step, in which the solids contained in the slurry are separated and a weak brine remains.

The first and/or the at least one further separation step preferably comprises filtration. Said filtration in a particularly preferred manner is performed using a filter press.

Alternatively, it may also be proceeded in such a manner that the solid-liquid separation according to step b) is performed by a continuous separation process, wherein the slurry and an aqueous phase are conducted in counter-flow, and contacted, in a continuously operating separation device, in particular a band filter or a vacuum band filter. In doing so, a weak brine can be withdrawn upon passage through a first section of the continuous separation device, and a strong brine can be withdrawn upon passage through a further section of the continuous separation device.

It may preferably be further provided that the weak brine remaining after the second and/or any further separation step, or water, or the weak sole withdrawn from the continuous separation device, is used for slurrying the bypass dust, or the formed filter cake, in step a) and/or for washing out the filter cake resulting from the first or second separation step.

A preferred reutilization of the reusable components of the bypass dusts is feasible in that the separated solids, after optionally required drying, are returned into the cement production process, in particular as cement grinding additive or as raw meal components.

It is preferably proceeded in such a manner that in step c) $CO_2$ or carbonates, in particular alkali carbonates such as $Na_2CO_3$ or $K_2CO_3$, are added as precipitant to the brine for precipitating $CaCO_3$. $CO_2$-containing exhaust gas may advantageously be withdrawn from the kiln and used as precipitant in step c). Alternatively, such precipitation can be performed with other chemicals if the latter form poorly soluble calcium salts. One of these poorly soluble salts may, for instance, be a calcium oxalate.

In order to also enable the precipitated Ca salts to be recycled in the cement production process, it is preferably proceeded such that the Ca salt precipitated in step c) is added to the slurry in step a) and separated as a solid in step b).

The separation of heavy metals is preferably performed by sulfide precipitation. In doing so, $Na_2S$ is advantageously used as precipitant for the sulfide precipitation. It has turned out that, when using $Na_2S$, it is not required to previously add an oxidant (e.g. iron sulfate). In conventional methods, this oxidation serves to oxidize low-valent metals, since it is known that the sulfides of higher-valent metals are more difficult to dissolve, and hence can be more easily precipitated. Tests have, however, shown that the omission of this oxidative reaction surprisingly does not lead to a substantial increase in the solubility of low-valent metal salts. As compared to the conventional two-step methods (oxidation and precipitation), the one-step method resulting from the omission of the oxidation (direct precipitation) constitutes a substantial simplification.

Advantageously, it is further proceeded in such a manner that the precipitation of Ca takes place after the precipitation of the heavy metals. After the solid-liquid separation, the brine, as a rule, contains in fact a measurable and significant portion of dissolved calcium hydroxide. The pH of this solution is about 12, which corresponds to the pH of a saturated calcium hydroxide solution. If the sulfide precipitation is carried out prior to the precipitation of Ca, the sulfide precipitation will be performed in a buffered alkaline solution. In doing so, it was realized that the precipitation of heavy metals in an alkali solution buffered with calcium hydroxide, and without previous oxidation of low-valent metal salts, surprisingly takes place substantially completely. This is why the specified procedure allows metals occurring in a bypass-dust brine to be nearly quantitatively separated.

If the bypass dusts contain lithium, it may preferably be proceeded such that step c) further comprises the precipitation of lithium as $Li_2CO_3$, wherein carbonates are preferably used as precipitants, having a higher solubility than $Li_2CO_3$. Said precipitation may, in particular, be performed using $Na_2CO_3$ or $K_2CO_3$.

In a preferred manner, step c) after the separation of heavy metals, and optionally after the precipitation of calcium, further comprises the addition of a strong oxidant from outside, in particular $H_2O_2$, or the creation of oxidizing conditions within the solution, in order to remove sulfide anions ($S^{2-}$). In a method in which the heavy metals are precipitated first and Ca is only precipitated thereafter, the strong oxidant can be added either immediately after the precipitation of the heavy metals or after the precipitation of Ca. Since the injection of $CO_2$ shifts the pH into the acidic range, it is, however, to be preferred to perform the destruction of the sulfide anions directly after the precipitation of the heavy metals. Yet, it was found that the precipitation of calcium runs quantitatively, even in the highly concentrated alkali salt solution of the bypass-dust brine, in particular at an alkaline pH of 12 (i.e. also before the sulfide destruction) and also after neutralization.

In a method in which the heavy metals are precipitated first and Ca is only precipitated thereafter, the heavy-metal precipitate can be separated before the calcium carbonate precipitate. It was, however, observed that the heavy-metal precipitate need not be separated before the calcium carbonate precipitate. On the contrary, it may even be advantageous to have both precipitates present at the same time. To this end, an accordingly adapted separation process was developed, utilizing the physicochemical properties of the heavy-metal and calcium-carbonate precipitates in the bypass-dust brine. It could actually be observed that the heavy metal salts form very unstable aggregates/agglomerates which would decompose into individual particles during filtration. A filtration of the precipitates is, therefore, generally considered as less preferred.

A comparison of the sedimentation speeds of heavy-metal precipitates and calcium-carbonate precipitates showed that the heavy metals sediment more rapidly. In addition, it was found that the sedimentation of a suspension containing both precipitates runs faster than in the "separate" suspensions (in which one sedimentation is performed after the other). It was observed that the precipitated heavy-metal sulfides strongly agglomerated, which was indicative of their high surface charge. These salts, therefore, act like "sedimentation aids". The physicochemical explanation is that the "charged" heavy-metal precipitates act as flocculants for the carbonate precipitates, and the "mixed" agglomerates/aggregates will become heavier (larger), thus sedimenting more rapidly than the separate suspensions.

The following procedure is therefore preferred: At first, the heavy-metal precipitation is performed, and then the carbonate precipitation is effected without solid-liquid separation and before or after the destruction of sodium sulfide. This suspension is then separated into a liquid and a solid phase by the co-sedimentation of metal sulfides and calcium carbonates.

A strong acid, in particular HCl, is preferably added at the end of step c) to lower the pH. This step has the following advantages. The pH is lowered to a neutral value (about 7-8) so as to make a simple, saturated salt solution from the alkaline solution. In addition, an excess of the oxidant $H_2O_2$ is destroyed. This constitutes a "chemical preparation stage" in order to facilitate the subsequent crystallization. It was, in fact, realized that the destruction of $H_2O_2$ prevents the solution from strongly foaming during crystallization (under a possible negative pressure or during heating). Such foaming would imply a loss of time in the crystallization process due to the gas formation involved in the destruction of $H_2O_2$. Moreover, the addition of HCl excludes the formation of any peroxides or other oxidized compounds from the remaining oxidant. This procedure is thus accordingly safer than one without neutralization step. It was finally realized that materials that would otherwise be destroyed by the strong oxidant can be selected in the large-scale plant. The hydrochloric acid used for neutralizing the solution was especially chosen, because thereby only chloride ions were added to the solution, thus avoiding a contamination of the solution with other anions.

The waste heat from the cement production process, in particular from the preheater or the clinker cooler, is preferably used in the fractional crystallization in step d) for evaporating the processed brine. The waste heat from the cement production process, in particular from the preheater or the clinker cooler, may optionally also be used for drying the salt obtained in step d).

In doing so, it will, in particular, be beneficial if the waste heat from the cement production process, in particular the preheater or the cement cooler, is supplied to vapor generation, and the vapor is used for heating and evaporating the processed brine in step d), the evaporated water of the brine being at least partially supplied to said vapor generation. In addition, a heat carrier oil may also be employed as heat transfer means.

Reuse of the process water is preferably feasible in that the water evaporated in step d), of the brine is at least partially used for slurrying the bypass dusts and/or for slurrying or washing out the solids separated in the various separation steps.

In the following, the invention will be explained in more detail by way of exemplary embodiments schematically illustrated in the drawing. Therein, FIG. 1 depicts a first exemplary embodiment and FIG. 2 shows a modified exemplary embodiment.

Figure 2:
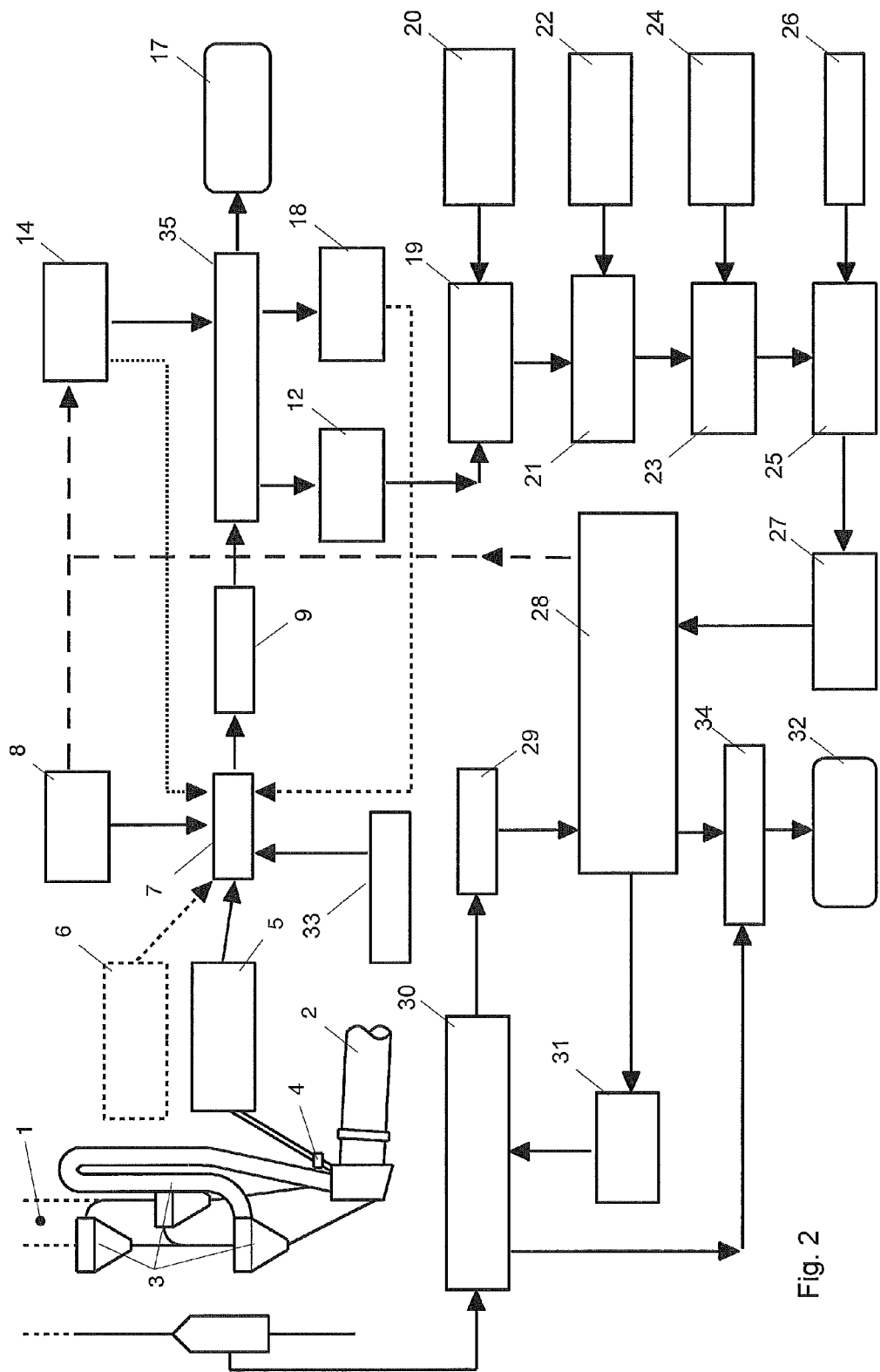
FIG. 2 shows another embodiment which is a modification of the first exemplary embodiment.

In FIG. 1, a cement production process is schematically indicated by 1, comprising a rotary tubular kiln 2 and a pre-calcining or preheating system 3 connected to the charging end of the rotary tubular kiln 2. At the location schematically indicated by 4, bypass dusts are taken from the cement production process and stored in a silo 5. In a further silo 6, dusts optionally taken from another point of the cement production process are stored. According to step a) of the method according to the invention, the dusts from silos 5 and 6 are respectively supplied to a mixing device 7, in which the dusts are contacted with an aqueous phase and/or a weak alkaline brine stored in a tank 8 and 14 or 18, respectively, and are thoroughly mixed to obtain a homogenous slurry. If desired, hydrochloric acid can be added to the dissolution process occurring in the mixing device 7 in order to adjust the contents of alkalis and halogenides. By 9 is schematically denoted an extraction step in which the soluble components of the slurry are washed out of the solid components and dissolved in the aqueous phase. The slurry is supplied to a filter press 10 by performing step b) of the method according to the invention. In doing so, the solids contained in the slurry are separated, with a filter cake 11 being obtained and a strong alkaline brine 12 remaining. The filter cake 11 is subsequently slurried in the mixing device 13 using process water 14 and/or weak alkaline brine, wherein a further extraction step 15 is performed by washing out the soluble components that have remained in the filter cake in the first separation step. In a consecutively arranged filter press 16, the solid components are separated in a second separation step, with a filter cake 17 being obtained and weak alkaline brine 18 remaining. The filter cake 17 is subsequently dried and can be returned to the cement production process 1 as a raw meal component or as a cement grinding additive.

The weak alkaline brine 18 is supplied to the filter press 10 such that the dissolved components contained in the weak brine 18 will finally be contained in the strong brine 12.

According to step c) of the method according to the invention the strong alkaline brine 12 is subjected to a precipitation 19 of calcium, the precipitant being, for instance, formed by $CO_2$ 20. The poorly soluble calcium salt will thereby precipitate in sedimentation tanks, and the precipitated calcium is separated. In a further step 21, heavy metals are precipitated from the alkaline brine, which is effected by the addition of sulfides 22, in particular $Na_2S$. The precipitation again takes place in sedimentation tanks, with the precipitated heavy metals being separated. Alternatively, the heavy-metal precipitation may also be effected prior to the Ca precipitation. In a method variant, the precipitated heavy metals and the precipitated calcium salts may also be separated together.

After this, sulfide anions are oxidized in step 23 by the addition or preparation of a strong oxidant 24. In step 25, the pH is, furthermore, lowered by the addition of a strong acid 26, in particular HCl.

From this results a processed, purified brine 27, which is subjected to a fractional crystallization 28. Water vapor 29 produced by the waste heat 30 from the preheater exhaust gas or from the clinker cooler waste air is used to heat and evaporate the brine. The evaporated water 31, i.e. condenser water, from the fractional crystallization 28 is used to produce the water vapor 29. The condenser water from the fractional crystallization 28, moreover, can also be used as process water 14 as indicated by the broken line.

The fractional crystallization 28 produces several salts 32, these being primarily KCl, NaCl and mixtures thereof. KCl can be used with particular advantage in the fertilizer industry. NaCl and KCl/NaCl mixtures can, for instance, be employed as deicing agents, in particular for traffic surfaces, or even in the aluminum industry. The salts derived from the crystallization 28 are optionally subjected to salt drying (not illustrated) so as to obtain dried alkali salts 32.

In FIG. 2, the same reference numerals as in FIG. 1 have been used for identical method steps or plant parts. The exemplary embodiment according to FIG. 2 corresponds to the exemplary embodiment according to FIG. 1 except for the differences indicated below.

As opposed to the configuration according to FIG. 1, the method according to FIG. 2 comprises the addition of hydrochlorid acid 33 into the dissolution process occurring in the mixing device 7 in order to adjust the contents of alkalis and halogenides. An extraction step in which the soluble components of the slurry contained in the mixing device 7 are washed out of the solid components and dissolved in the aqueous phase is schematically denoted by 9. The slurry is subsequently supplied to a vacuum band filter 35. In the vacuum band filter, the slurry and process water (from 14) are conducted in counter-flow relative to each other. After a first section of the vacuum band filter, viewed in the transport direction of the slurry, a strong brine 12 is withdrawn, which is subjected to a treatment as in FIG. 1.

Finally, the salts derived from the crystallization 28 are subjected to salt drying 34 so as to obtain dried alkali salts 32.

The most important physical and chemical reactions to be applied in the present exemplary embodiments will be described below:

Formation of Hydrated Lime

The most important chemical reaction is the conversion of the free lime of the bypass dusts into hydrated lime. The reaction is strongly exothermic and induces rapid heating of the mixture. For safety reasons, it is necessary that the dust be admixed to the water and not vice versa, since a dust explosion might occur in the latter case. The chemical equation for this reaction is as follows:

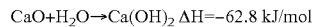

$$CaO + H_2O \rightarrow Ca(OH)_2 \quad \Delta H = -62.8 \text{ kJ/mol}$$

In addition to this reaction, the reaction of readily soluble hydroxides with readily soluble calcium salts such as $CaCl_2$ can also lead to hydrated lime. Due to the precipitation of hydrated lime, the reaction equilibrium is shifted to the product side.

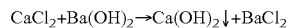

$$CaCl_2 + Ba(OH)_2 \rightarrow Ca(OH)_2 \downarrow + BaCl_2$$

Hydrated lime is a very strong, yet only slightly soluble lye. The pH consequently reaches about 10. Due to the salt content in the brine, the solubility of hydrated lime will increase ("salting effect"), thus causing a pH of approximately 12-13 to adjust in the brine.

Secondary Reactions of Hydrated Lime

A number of metals and heavy metals form poorly soluble hydroxides at pH values>7. This means that the major portion of the heavy metals is bound in the slurry by the hydrated lime. Only will the alkali metals sodium and potassium as well as barium and strontium not be trapped by hydrated lime. It is preferred to perform the purification of the salts from the brine already at this point of the method. On the other hand, it is not possible to eliminate the heavy metals from the bypass dusts by this type of treatment.

Limitation of the Solubility of Gypsum

Hydrated lime is more soluble than gypsum ($CaSO_4$), which is why the solubility of calcium sulfate will be markedly reduced due to the solution equilibrium in the mixed system, calcium sulfate—calcium hydroxide—water (t=25° C.). The concentration of the dissolved calcium sulfate is about 1.4 mmol per liter, which corresponds to less than a third of the concentration to be normally expected.

Sulfate Precipitation

Formation of Gypsum by Precipitation

More readily soluble sulfates react with hydrated lime while forming gypsum. There are two different reaction principles, i.e. single precipitation and double precipitation.

Single Precipitation

A typical single precipitation reaction occurs between alkali sulfates and dissolved hydrated lime:

$$Ca(OH)_2 + K_2SO_4 \rightarrow CaSO_4\downarrow + 2KOH$$

This type of reaction is the reason for the pH being maintained at values of >7, even after the precipitation of the dissolved hydrated lime as limestone.

Double Precipitation Reaction

A typical double precipitation reaction occurs between readily soluble sulfates and dissolved hydrated lime while forming poorly soluble hydroxides:

$$Ca(OH)_2 + MgSO_4 \rightarrow CaSO_4\downarrow + Mg(OH)_2\downarrow$$

This type of reaction is the reason for the brine containing substantially no magnesium, even though the magnesium content in the dust is high.

Formation of Gypsum by Redox Reactions

Sometimes the dust comprises calcium sulfite, which will immediately start to react with calcium sulfate due to its instability in water. There are basically two reaction principles, i.e. disproportioning and oxidation.

Disproportioning of Calcium Sulfite

Disproportioning usually takes place even if no oxidant is present:

$$4CaSO_3 \rightarrow 3CaSO_4 + CaS$$

Oxidations

In the presence of oxidants, gypsum is directly formed either of calcium sulfite or of calcium sulfide:

$$2CaSO_3 + O_2 \rightarrow 2CaSO_4$$

$$CaS + 2O_2 \rightarrow CaSO_4$$

Precipitation by Gypsum

Traces of gypsum are dissolved and produce sulfate ions, which are of greatest importance for the precipitation of barium, strontium and lead. The aforementioned metals are thus precipitated as sulfates.

Dissolving the Soluble Alkali Chlorides

The chlorides of sodium and potassium remain unaffected by the presence of free lime. Moreover, part of the energy released during the formation of hydrated lime is spent to dissolve the same:

$$NaCl + nH_2O \rightarrow [Na^+ + Cl^-] \times nH_2O \quad \Delta H = +3.8 \text{ kJ/mol}$$

$$KCl + nH_2O \rightarrow [K^+ + Cl^-] \times nH_2O \quad \Delta H = +13.0 \text{ kJ/mol}$$

Carbonate Precipitation of Hydrated Lime

One of the reactions taking place in the posttreatment of the brine comprises the removal of the dissolved hydrated lime by carbonate precipitation. The simplest way is to directly blow $CO_2$-rich gas into the brine. The reaction equation is as follows:

$$CO_2 + OH^- \rightarrow HCO_3^-$$

$$2Ca(OH)_2 + 2HCO_3^- \rightarrow 2CaCO_3\downarrow + 2H_2O + 2OH^-$$

Sulfide Precipitation of Heavy Metals

Most heavy metals form sulfides that are very difficult to dissolve. Sulfide precipitation is thus a stable and safe way to eliminate heavy metals even in traces. The reagent for the precipitation comprises either gaseous $H_2S$ or a solution of $Na_2S$. In the former case, dosing is rather difficult, which is why the use of a $Na_2S$ solution is viable. The basic reaction of sulfide precipitation is indicated below, "Me" referring to any heavy metal:

$$2Me^+ + Na_2S \rightarrow Me_2S\downarrow + 2Na^+$$

$$Me^{2+} + Na_2S \rightarrow MeS\downarrow + 2Na^+$$

$$2Me^{3+} + 3Na_2S \rightarrow Me_2S_3\downarrow + 6Na^+$$

Side-Reactions of Sulfide Precipitation

The sulfide ion is a strongly reducing reagent, the oxidation of the sulfide ion terminating with the sulfate ion in alkaline environment as compared to acidic or neutral conditions:

$$S^{2-} + 8OH^- \rightarrow SO_4^{2-} + 4H_2O + 8e^-$$

The high reduction potential of the oxidation semireactions causes the reduction of oxidized metal ions such as $Cr^{6+}$, which will subsequently be again reduced to $Cr^{3+}$.

Posttreatment Reactions

Removal of Excess Sulfides

Due to the necessity to lower the pH of the brine, the excess of sulfides has to be eliminated prior to the addition of acid. This is done in a simple manner by oxidation using strong oxidants such as $H_2O_2$. The greatest advantages of $H_2O_2$ are its harmless decomposition products, namely water and oxygen. The basic oxidation reaction is as follows:

$$S^{2-} + 4H_2O_2 \rightarrow SO_4^{2-} + 4H_2O$$

This reaction should preferably be performed, because unless the sulfides are removed prior to lowering the pH, the following reaction will occur, forming highly noxious hydrogen sulfide:

$$S^{2-} + 2HCl \rightarrow 2Cl^- + H_2S\uparrow$$

PH-Adjustment of the Brine

The pH in the present method is strongly basic, from the formation of the hydrated lime to the removal of the excess of sulfides. This is extremely beneficial in terms of the formation of a passivating layer that serves as a corrosion protection of ferrous fittings employed when implementing the method according to the invention. Before the final treatment in a crystallizer, the pH must, however, be lowered to increase the yield and purity of the salts.

During such lowering, it is preferably taken care that the corrosion protection of the boiler materials will not be substantially reduced, in particular to a pH of 8-9. The lowering of the pH is achieved by the addition of hydrochloric acid, since hydrochloric acid has the least influence on the quality of the finally obtained salt products. The major portion of present hydroxides and carbonates is converted into water and $CO_2$:

$$K_2CO_3 + 2HCl \rightarrow 2KCl + H_2O + CO_2\uparrow.$$

The invention claimed is:

1. A method for processing and utilizing bypass dusts obtained during the production of cement, comprising the steps of
   a) contacting the bypass dust with an aqueous phase and mixing the bypass dust with the aqueous phase to obtain a homogenous slurry, with water-soluble components of the bypass dust being dissolved in the aqueous phase,
   b) carrying out a solid-liquid separation to separate solids contained in the slurry, with a brine remaining,
   c) separating heavy metals present in the brine and precipitating calcium to obtain a processed brine, and
   d) subjecting the processed brine to a fractional crystallization.

2. A method according to claim 1, wherein the ratio of bypass dust to aqueous phase in step a) is 1:1 to 1:2.

3. A method according to claim 1, wherein HCl is added in step a).

4. A method according to claim 1, wherein a first separation step is performed according to step b) to obtain a first brine, which is fed to step c), and that the solids separated in the first separation step are slurried using an aqueous medium, wherein the water-soluble components of the solids are dissolved in the aqueous phase and the thus obtained slurry is subjected to at least a further separation step in which the solids contained in the slurry are separated and a second brine remains.

5. A method according to claim 4, wherein the first and/or the at least one further separation step comprises filtration.

6. A method according to claim 5, wherein said filtration is performed using a filter press.

7. A method according to claim 1, wherein the solid-liquid separation according to step b) is performed by a continuous separation process, wherein the slurry and an aqueous phase are conducted in counter-flow, and contacted, in a continuously operating separation device.

8. A method according to claim 7, wherein a second brine is withdrawn upon passage through a first section of the separation device, and a first brine is withdrawn upon passage through a further section of the separation device.

9. A method according to claim 4 or 8, wherein the second brine remaining after the second and/or the at least one further separation step, or withdrawn from the separation device, is used for slurrying the bypass dust in step a), and/or for washing out or slurrying the filter cake resulting from the first or the at least one further separation step.

10. A method according to claim 1, wherein the separated solids, after optionally being dried, are returned into the cement production process.

11. A method according to claim 1, wherein in step c) a precipitant is added to the brine for precipitating calcium salts.

12. A method according to claim 11, wherein $CO_2$-containing exhaust gas is withdrawn from a kiln and used as precipitant in step c).

13. A method according to claim 1, wherein calcium salt precipitated in step c) is added to the slurry in step a) and separated as a solid in step b).

14. A method according to claim 1, wherein the separation of heavy metals is performed by sulfide precipitation.

15. A method according to claim 14, wherein $Na_2S$ is used as precipitant for the sulfide precipitation.

16. A method according to claim 1, wherein the precipitation of calcium salts takes place after the precipitation of the heavy metals.

17. A method according to claim 16, wherein the precipitation of Ca is performed after the heavy-metal precipitation without previous solid-liquid separation of the precipitated heavy metals, and that a formed suspension is then separated into a liquid and a solid phase by a co-sedimentation of heavy metals and calcium salts.

18. A method according to claim 1, wherein step c) further comprises precipitation of lithium as $Li_2CO_3$, wherein carbonates having a higher solubility than $Li_2CO_3$ are used as precipitants.

19. A method according to claim 14, wherein step c) after the precipitation of heavy metals, and optionally after the precipitation of calcium, further comprises the addition or preparation of an oxidant to remove sulfide anions ($S^{2-}$).

20. A method according to claim 19, wherein the addition or preparation of the oxidant is performed after a precipitation of sulfides and prior to the precipitation of calcium.

21. A method according to claim 1, wherein an acid, is added at the end of step c) to lower the pH.

22. A method according to claim 1, wherein waste heat from the cement production process is used in the fractional crystallization in step d) for evaporating the processed brine, and optionally for drying an obtained salt.

23. A method according to claim 22, wherein the waste heat from the cement production process is supplied to vapor generation and the vapor is used for heating and evaporating the processed brine in step d), wherein evaporated water of the brine is at least partially supplied to said vapor generation.

24. A method according to claim 1 or 4, wherein water evaporated in step d), of the brine is at least partially used for slurrying the bypass dusts and/or for slurrying or washing out the solids separated in the first and/or a further separation steps.

25. A method according to claim 1, wherein the solid-liquid separation of step b) comprises a vacuum filtration or a filter press filtration.

26. A method according to claim 7, wherein the separation device is a band filter or a vacuum band filter.

27. A method according to claim 11, wherein the precipitant is comprised of $CO_2$ or carbonates.

28. A method according to claim 16, wherein the calcium salts are $CaCO_3$.

29. A method according to claim 21, wherein the acid is HCl.

30. A method according to claim 22, wherein waste heat from the preheater or the clinker cooler is used in the fractional crystallization in step d).

31. A method according to claim 23, wherein the waste heat from the preheater or the cement cooler is supplied to vapor generation.

* * * * *